No. 826,365. PATENTED JULY 17, 1906.
C. SCHMIDT.
GEARING FOR MOTOR VEHICLES.
APPLICATION FILED JUNE 22, 1903.

2 SHEETS—SHEET 1.

Witnesses
Inventor
Charles Schmidt
Foster Freeman & Watson
Attorneys

No. 826,365. PATENTED JULY 17, 1906.
C. SCHMIDT.
GEARING FOR MOTOR VEHICLES.
APPLICATION FILED JUNE 22, 1903.

2 SHEETS—SHEET 2.

Witnesses
Inventor
Charles Schmidt
Attorneys

UNITED STATES PATENT OFFICE.

CHARLES SCHMIDT, OF WARREN, OHIO, ASSIGNOR TO THE PACKARD MOTOR CAR COMPANY, OF WARREN, OHIO, A CORPORATION OF WEST VIRGINIA.

GEARING FOR MOTOR-VEHICLES.

No. 826,365.        Specification of Letters Patent.        Patented July 17, 1906.

Application filed June 22, 1903. Serial No. 162,631.

*To all whom it may concern:*

Be it known that I, CHARLES SCHMIDT, a citizen of France, residing at Warren, in the county of Trumbull and State of Ohio, have invented certain new and useful Improvements in Gearing for Motor-Vehicles, of which the following is a specification.

This invention relates to a construction in which the transmission-gearing of a motor-vehicle is connected intimately with the rear axle.

The invention will be described in connection with the accompanying drawings, in which—

Figures 1, 1A:
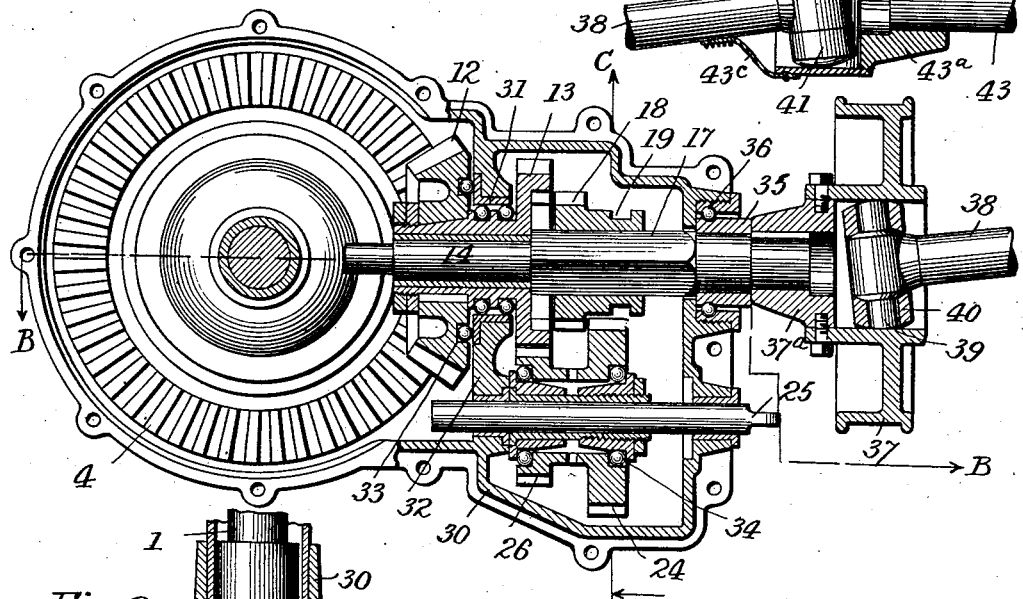
Figure 2:
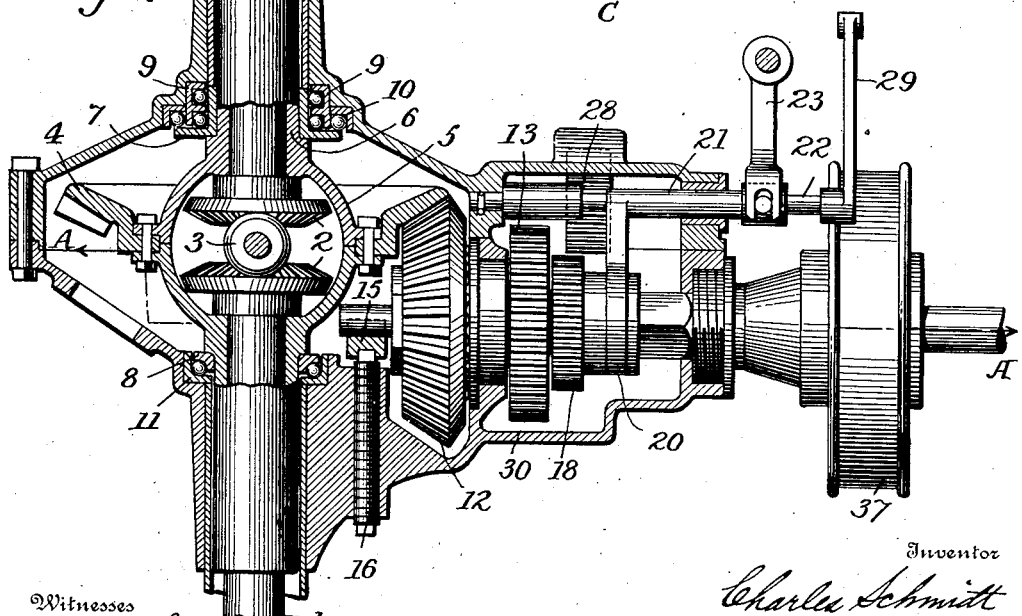
Figure 3:
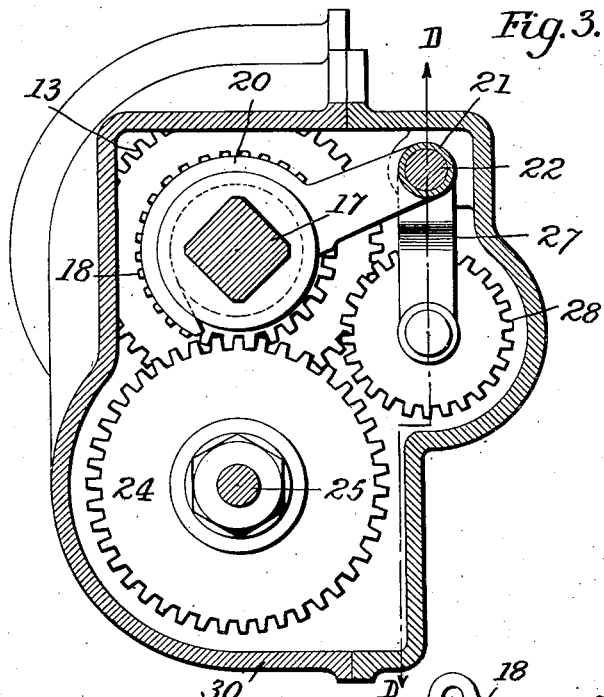
Figure 5:
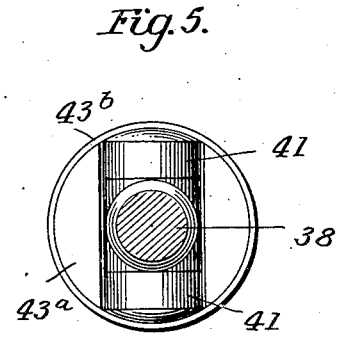
Figure 4:
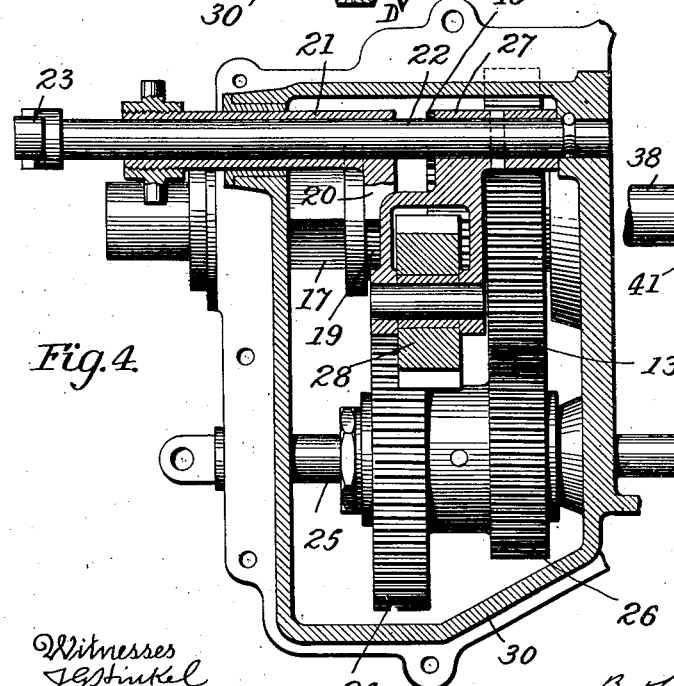
Figure 6:
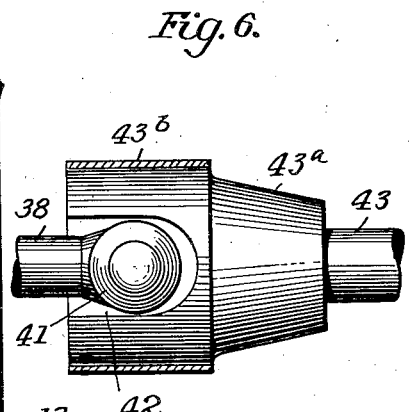

Figure 1 is a central vertical section through the gearing and the middle of the rear axle, being taken about on the line A A of Fig. 2. Fig. 1ª illustrates the opposite end of the connecting-shaft shown in Fig. 1. Fig. 2 is a horizontal section taken about on the line B B of Fig. 1. Fig. 3 is a section about on the line C C of Fig. 1. Fig. 4 is a section about on the line D D of Fig. 3. Figs. 5 and 6 are views of the universal joint shown in Figs. 1 and 1ª.

Referring to the drawings, 1 indicates the two sections of the rear axle, 2 2 the bevel-gears which drive the rear axle, and 3 the equalizing-gears. The equalizing-gears are driven by a large bevel-gear 4, which is mounted upon a spherical shell or casing 5, surrounding and supporting the equalizing-gears, the said shell being provided with hollow shafts or hubs 6, which surround the rear-axle sections and which are provided with hardened annular bearings 7 8 of rectangular cross-section. The bearing 7, which is at the back of the gear 4, receives the greater thrust, and to resist the thrust and strain it is provided with three sets of balls running in three separate ball-races. As shown, two of these ball-races are in a hardened ring 9 and the third ball-race in a hardened ring 10. Two of the sets of balls bear on flat faces of the bearings 7 and the other set runs in the angle of the bearing. The end thrust and the lateral strain upon the hollow shaft 6 are each thus transmitted to two sets of ball-bearings. The bearing on the forward or face side of gear 4 has a single series of balls running between two angular rings 8 and 11.

The gear 4 is driven by a corresponding bevel-gear 12, which is rigidly connected to a sleeve consisting of a tubular extension or hub of a driving-gear 13, the said hub being arranged to revolve freely upon the main gear-shaft 14. Said gear 12 is therefore rotatably mounted on and coaxial with the main gear-shaft 14. The inner end of said shaft is supported by a bearing 15, which is provided with an adjustable support 16, by means of which the bearing may be adjusted to take up wear.

On an angular portion 17 of the main gear-shaft is a sliding pinion 18, provided with an annular groove 19, which is engaged by a yoke 20, carried by a sleeve 21. The sleeve 21 is mounted upon a short rock-shaft 22 and may be shifted lengthwise of said shaft by a lever 23 and suitable connections to the controlling-lever of the motor-vehicle. The gear 18 is adapted to mesh with internal teeth on the gear 13, thus directly connecting said gear 13 with the main gear-shaft 14, in which case the vehicle is driven directly from the engine without the aid of any transmission-gearing, giving a high speed with a minimum friction and loss of power.

As shown in Fig. 1, the gear 18 is not in mesh with any other gear, and the engine is thus disconnected from the driving-wheels. This is the intermediate position of the gear 18. When the gear 18 is shifted forward from the position shown in Fig. 1, it engages a gear 24, which rotates on ball-bearings on a non-rotating counter-shaft 25. The gear 24 is rigidly connected to or integral with a smaller gear 26, which is adapted to intermesh with the gear 13. When the gears 24 26 are in the position shown in Fig. 1 and gear 18 is in mesh with gear 24, the vehicle will be operated at a reduced forward speed. When gear 18 is engaged with the internal teeth of gear 13, the gear 26 is preferably disengaged from gear 13 by a forward movement of the shaft 25, suitable connections being provided for this purpose. This prevents the gears 24 26 from running idle and decreases the wear on them. On shaft 22, Figs. 2, 3, and 4, is a fixed arm 27, which carries the reverse-gear 28. This gear is broad enough to engage both of the gears 18 and 24 when said gears are in the position shown in Fig. 1. By rocking shaft 22 gear 28 is engaged and disengaged with gears 18 and 24. The rotation of gears 24, 26, and 13 and of the driving-wheels is thus reversed, the vehicle being given a slow backward movement. The shaft 22 is provided with an operating-lever 29, which is suitably connected to the controlling mechanism of the vehicle.

All of the gears previously described are inclosed in a two-part casing 30, which casing is supported from the rear axle and in turn supports the gearing. The ball-races 9, 10, and 11 are seated in the casing, and the axles and equilizing-gears are thus supported. The hub of gear 13 is provided with ball-races and two series of balls running on an annular bearing 31, which is supported on an inwardly-projecting flange 32, integral with the casing. It will be noted that the flange 32 forms a partition which divides the casing 30 into two compartments, one compartment containing the variable-speed gears and the other compartment containing the differential gear and its driving-gears. The sleeve which carries the gears 12 and 13 has its bearing rigidly supported in this partition. The flange or partition 32 strengthens the casing and forms an excellent support for the variable-speed gears. The bearing 31 also supports the main gear-shaft 14, which turns in the hub of gear 13. The gear 12 is preferably provided with a ball-race 33, containing a series of balls which run on a flange of the bearing 31 and take the backward thrust of the gear. The gears 24 26 run on balls which encircle adjustable bearings 34, mounted on the sliding shaft 25. The forward end of the shaft 14 is provided with a hardened ring 35, which travels on ball-bearings 36, mounted in the forward end of the casing.

Upon the forward end of shaft 14 is rigidly fixed a brake-wheel 37, to which a brake may be applied by any suitable means. In the center of the hub 37ª of wheel 37 is a rectangular recess forming one part of the universal joint between a shaft 38 and shaft 14. The inner end of shaft 38 is provided with trunnions 39, upon which are hardened-steel rollers 40. The rollers are substantially of the same diameter as the width of the recess, and the trunnions 39 are curved and loosely fit the ends of the recess. The opposite end of the shaft-section 38 is provided with similar hardened rollers 41, fitting a similar rectangular recess 42 in a hub 43ª on the end of the engine or power-shaft 43. The recess in hub 43ª is closed at its ends by a sleeve 43ᵇ, and the front of the recess may be closed by a flexible cover 43ᶜ. This construction of rectangular recesses and rollers 40 and 41 has been found to form a very simple and efficient universal joint and is especially adapted for the flexible connection necessary to transmit power from the engine to the driving-wheels.

It will be seen that this invention provides for locating all of the transmission-gearing in fixed relation to the equalizing-gear and the rear axles and also provides for housing all of the gearing in a single casing. The location of the transmission-gearing immediately at the rear axle avoids the necessity of transmitting the heavy strains in climbing hills at slow speeds through a long line of shafting. The said strains are practically not transmitted through any shafting, but directly from the reducing-gears to the rear axles. The compact construction described is also light and economical as compared with other forms of gearing.

Having described my invention, what I claim, and desire to secure by Letters Patent, is—

1. In a motor-vehicle, the combination with a casing, of equalizing-gears mounted in bearings in said casing, axle-sections connected with said equalizing-gears, a pair of bevel-gears 4, 12 for operating the equalizing-gears, the gear 12 having a bearing in said casing, and variable-speed gears in said casing for operating the gear 12 at different speeds.

2. In a motor-vehicle, the combination with a casing, of equalizing-gears having hub-mounted in bearings in said casing, axle-sections connected with said gears and extending through said hubs, bevel-gears 4, 12, for operating the equalizing-gears, the gear 12 having a bearing in an internal flange of said casing, relatively shiftable variable-speed gears mounted in said casing, and means for shifting said gears and driving the same to impart different speeds to the axle-sections.

3. In a motor-vehicle, the combination with a common casing of rear axle-bearings and differential gears within the casing, a sleeve having a bearing in the casing, a driving-gear 13 and a beveled gear 12 rigidly connected with said sleeve, said gear 12 being arranged to drive the differential gears, a shaft 14 having bearings in said sleeve and in the casing respectively, and means for driving the said sleeve from said shaft at different speeds.

4. In a motor-vehicle, the combination with a main gear-shaft and a counter-shaft and suitable speed-gears thereon, of a sliding gear on the said main shaft, a rock-shaft, a backing-gear carried by an arm of the rock-shaft, a sleeve sliding on said rock-shaft and an arm on said sleeve engaging said sliding gear.

5. In a motor-vehicle, the combination with the rear axle, the equalizing-gears and the transmission-gears 4, 12, of the power-shaft, the speed and reverse gears, the clutch for connecting the power-shaft directly to the gear 12, and a common casing inclosing all of said gears and said clutch.

6. In a motor-vehicle, the combination of the main gear-shaft 14, the gear 13 free to rotate thereon and provided with external and internal teeth, the gear 12 rigidly connected with the gear 13, the differential gears driven from the gear 12, the gear 18 turning with and sliding on said gear-shaft, the counter-shaft having gears adapted to mesh with said gears 13 and 18, and means for sliding the gear 18 on its shaft, for the purpose set forth.

7. In a motor-vehicle, the combination of the main gear-shaft 14, the gear 13 free to rotate thereon and provided with external and internal teeth, the gear 18 turning with and sliding on said shaft, the counter-shaft having gears 24, 26 adapted to mesh with said gears 13 and 18, means for sliding the gear 18 on its shaft, and means for moving the gears 24, 26 in the direction of their axis, for the purpose set forth.

8. In a motor-vehicle, the combination with the rear axle, the equalizing-gears and the transmission-gears 4, 12, of a power-shaft having a bearing coaxial with the bearing of the gear 12, said gear and shaft being independent, a clutch for connecting the power-shaft directly to the gear 12, a gear 13 rigidly connected with the gear 12 and gearing for connecting the power-shaft indirectly to the gear 13, whereby the gear 12 may be driven at different speeds.

9. In a motor-vehicle, the combination with the rear axle, the equalizing-gears and the transmission-gears 4, 12, of a power-shaft having a bearing coaxial with the bearing of the gear 12, said gear and shaft being independent, a clutch for connecting the power-shaft directly to the gear 12, a gear 13 rigidly connected with the gear 12, gearing for connecting the power-shaft indirectly to the gear 13, whereby the gear 12 may be driven at different speeds, and a common casing inclosing all of said gears and said clutch.

10. In a motor-vehicle, the combination with a casing having a transverse internal flange, of variable-speed gears arranged in the compartment on one side of said flange, equalizing-gears in the compartment upon the opposite side of said flange, and a part extending through and having a bearing in said flange for transmitting movement from the variable-speed gears to the equalizing-gears.

11. In a motor-vehicle, the combination with the casing having a transverse internal flange, of a pair of rigidly-connected gears arranged on opposite sides of said flange and having an intermediate bearing in said flange, variable-speed gears and a reverse-gear in the compartment on one side of said flange and adapted to drive one of said pairs of gears, and equalizing-gears in the compartment upon the opposite side of said flange and adapted to be driven by the other of said pairs of gears.

12. In a motor-vehicle, the combination with an inclosed casing having a transversely-arranged bearing, a pair of gears carried by said bearing and arranged respectively on opposite sides thereof, variable-speed gears and a reverse-gear within the casing at one side of said bearing and adapted to operate one of said pairs of gears, and equalizing-gears within the casing upon the opposite side of said bearing and adapted to be operated by the other of said pair of gears, the equalizing-gears being also supported in bearings in said casing.

In testimony whereof I have signed my name to this specification in the presence of two subscribing witnesses.

CHARLES SCHMIDT.

Witnesses:
RUSSELL HUFF,
H. V. BATCHELLER.